(12) United States Patent
Yeung et al.

(10) Patent No.: US 12,462,385 B2
(45) Date of Patent: Nov. 4, 2025

(54) WEAKLY-SUPERVISED SYSTEM, METHOD AND WORKFLOW FOR PROCESSING WHOLE SLIDE IMAGE FOR DISEASE DETECTION

(71) Applicants: THE HONG KONG POLYTECHNIC UNIVERSITY, Hong Kong (CN); THE CHINESE UNIVERSITY OF HONG KONG, Hong Kong (CN)

(72) Inventors: Ho Yin Martin Yeung, Hong Kong (CN); Ngai Nick Alex Wong, Hong Kong (CN); Jung Sun Yoo, Hong Kong (CN); Cheong Kin Ronald Chan, Hong Kong (CN); Ka Fai To, Hong Kong (CN)

(73) Assignees: The Hong Kong Polytechnic University, Hong Kong (CN); The Chinese University of Hong Kong, Hong Kong (CN)

( * ) Notice: Subject to any disclaimer, the term of this patent is extended or adjusted under 35 U.S.C. 154(b) by 369 days.

(21) Appl. No.: 18/331,232

(22) Filed: Jun. 8, 2023

(65) Prior Publication Data
US 2024/0193765 A1     Jun. 13, 2024

Related U.S. Application Data

(60) Provisional application No. 63/366,019, filed on Jun. 8, 2022.

(51) Int. Cl.
*G06T 7/00*     (2017.01)
*A61B 5/00*    (2006.01)

(52) U.S. Cl.
CPC ............ *G06T 7/0012* (2013.01); *A61B 5/004* (2013.01); *G06T 2207/20081* (2013.01); *G06T 2207/20084* (2013.01)

(58) Field of Classification Search
CPC ......... G06T 7/0012; G06T 2207/20081; G06T 2207/20084; A61B 5/004; A61B 5/7267
See application file for complete search history.

(56) References Cited

U.S. PATENT DOCUMENTS

| | | | |
|---|---|---|---|
| 10,740,896 B2 * | 8/2020 | Georgescu | G06N 20/00 |
| 2017/0161891 A1 * | 6/2017 | Madabhushi | G06F 18/2411 |
| 2020/0311931 A1 * | 10/2020 | Yeh | G06V 10/764 |

OTHER PUBLICATIONS

Esteva A, Chou K, Yeung S, Naik N, Madani A, Mottaghi A, et al. Deep learning-enabled medical computer vision. NPJ digital medicine. 2021;4(1):1-9.

(Continued)

*Primary Examiner* — Siamak Harandi
(74) *Attorney, Agent, or Firm* — S&F/WEHRW

(57) ABSTRACT

In generating training and testing datasets for machine learning, manual annotation of a large volume of data is impractical and expensive. A machine-learning model for detecting carcinoma (CA) from a whole slide image (WSI) processes average cellular features of cells identified on the WSI. Each cellular feature is a descriptive statistic of the cells, advantageously allowing the training and testing datasets to be constructed without a costly annotation process of pixelwise labelling each cell on a WSI training sample. Apart from predicting a CA case or a non-CA case for the WSI, the machine-learning model is also usable to: identify a suspicious CA case for priority assessment if a non-CA case is predicted for the WSI; generate a tumor probability heatmap of the WSI for visualizing potential CA regions on the WSI to assist pathological assessment; and assess quality control of a triage system before implementation in clinical setting.

18 Claims, 13 Drawing Sheets

(56) References Cited

OTHER PUBLICATIONS

Van der Laak J, Litjens G, Ciompi F. Deep learning in histopathology: the path to the clinic. Nature medicine. 2021;27 (5):775-84.
Araujo T, Aresta G, Castro E, Rouco J, Aguiar P, Eloy C, et al. Classification of breast cancer histology images using Convolutional Neural Networks. PLoS One. 2017;12(6):e0177544.
Kanavati F, Toyokawa G, Momosaki S, Takeoka H, Okamoto M, Yamazaki K, et al. A deep learning model for the classification of indeterminate lung carcinoma in biopsy whole slide images. Scientific Reports. 2021;11(1):1-14.
Bychkov D, Linder N, Turkki R, Nordling S, Kovanen PE, Verrill C, et al. Deep learning based tissue analysis predicts outcome in colorectal cancer. Scientific reports. 2018;8(1):1-11.
Kather JN, Pearson AT, Halama N, Jager D, Krause J, Loosen SH, et al. Deep learning can predict microsatellite instability directly from histology in gastrointestinal cancer. Nat Med. 2019;25(7):1054-6.
Nam S, Chong Y, Jung CK, Kwak T-Y, Lee JY, Park J, et al. Introduction to digital pathology and computer-aided pathology. Journal of pathology and translational medicine. 2020;54(2):125.
Bera K, Schalper KA, Rimm DL, Velcheti V, Madabhushi A. Artificial intelligence in digital pathology—new tools for diagnosis and precision oncology. Nature reviews Clinical oncology. 2019;16(11):703-15.
Marini N, Otálora S, Müller H, Atzori M. Semi-supervised training of deep convolutional neural networks with heterogeneous data and few local annotations: An experiment on prostate histopathology image classification. Medical image analysis. 2021:102165.
Campanella G, Hanna MG, Geneslaw L, Miraflor A, Silva VWK, Busam KJ, et al. Clinical-grade computational pathology using weakly supervised deep learning on whole slide images. Nature medicine. 2019;25(8):1301-9.
Hou L, Samaras D, Kurc TM, Gao Y, Davis JE, Saltz JH, editors. Patch-based convolutional neural network for whole slide tissue image classification. Proceedings of the IEEE conference on computer vision and pattern recognition; 2016.
Xu Y, Zhu J-Y, Eric I, Chang C, Lai M, Tu Z. Weakly supervised histopathology cancer image segmentation and classification. Medical image analysis. 2014;18(3):591-604.
Mun Y, Paik I, Shin S-J, Kwak T-Y, Chang H. Yet Another Automated Gleason Grading System (YAAGGS) by weakly supervised deep learning. npj Digital Medicine. 2021;4(1):1-9.
Wang X, Chen H, Gan C, Lin H, Dou Q, Tsougenis E, et al. Weakly supervised deep learning for whole slide lung cancer image analysis. IEEE transactions on cybernetics. 2019;50(9):3950-62.
Bukowy JD, Foss H, McGarry SD, Lowman AK, Hurrell SL, Iczkowski KA, et al. Accurate segmentation of prostate cancer histomorphometric features using a weakly supervised convolutional neural network. Journal of Medical Imaging. 2020;7(5):057501.
Matsui Y, Utsunomiya N, Ichioka K, Ueda N, Yoshimura K, Terai A, et al. The use of artificial neural network analysis to improve the predictive accuracy of prostate biopsy in the Japanese population. Japanese journal of clinical oncology. 2004;34(10):602-7.
Assi EB, Gagliano L, Rihana S, Nguyen DK, Sawan M. Bispectrum features and multilayer perceptron classifier to enhance seizure prediction. Scientific reports. 2018;8(1):1-8.
Lin S-K, Hsiu H, Chen H-S, Yang C-J. Classification of patients with Alzheimer's disease using the arterial pulse spectrum and a multilayer-perceptron analysis. Scientific reports. 2021;11(1):1-14.

\* cited by examiner

| Methods | Sensitivity | Specificity | PPV | NPV | Accuracy | F1 | MCC | AUC |
|---|---|---|---|---|---|---|---|---|
| GCNet | 0.877 (0.768 to 0.986) | 0.936 (0.897 to 0.975) | 0.897 (0.847 to 0.946) | 0.924 (0.851 to 0.996) | 0.913 (0.855 to 0.972) | 0.886 (0.814 to 0.958) | 0.825 (0.717 to 0.932) | 0.980 (0.956 to 1.005) |
| Support vector machine (linear kernel) | 0.937 (0.901 to 0.973) | 0.676 (0.574 to 0.778) | 0.824 (0.763 to 0.885) | 0.868 (0.803 to 0.934) | 0.837 (0.784 to 0.891) | 0.877 (0.833 to 0.92) | 0.673 (0.579 to 0.767) | 0.904 (0.864 to 0.945) |
| Logistic regression (L-BFGS solver) | 0.935 (0.896 to 0.973) | 0.641 (0.519 to 0.762) | 0.808 (0.735 to 0.882) | 0.858 (0.779 to 0.936) | 0.822 (0.765 to 0.879) | 0.866 (0.820 to 0.912) | 0.644 (0.543 to 0.745) | 0.887 (0.844 to 0.929) |
| Logistic regression (LIBLINEAR solver) | 0.933 (0.898 to 0.968) | 0.641 (0.519 to 0.762) | 0.808 (0.734 to 0.882) | 0.855 (0.782 to 0.928) | 0.821 (0.762 to 0.880) | 0.866 (0.818 to 0.913) | 0.642 (0.538 to 0.746) | 0.887 (0.844 to 0.930) |
| Logistic regression (Newton-cg solver) | 0.932 (0.882 to 0.981) | 0.639 (0.52 to 0.758) | 0.807 (0.731 to 0.883) | 0.854 (0.769 to 0.938) | 0.820 (0.758 to 0.881) | 0.864 (0.812 to 0.916) | 0.640 (0.536 to 0.744) | 0.887 (0.844 to 0.929) |
| Logistic regression (SAG solver) | 0.921 (0.872 to 0.969) | 0.607 (0.435 to 0.780) | 0.792 (0.699 to 0.886) | 0.826 (0.745 to 0.906) | 0.800 (0.727 to 0.874) | 0.851 (0.794 to 0.908) | 0.604 (0.476 to 0.732) | 0.857 (0.802 to 0.911) |
| Logistic regression (SAGA solver) | 0.921 (0.865 to 0.976) | 0.560 (0.410 to 0.710) | 0.773 (0.693 to 0.853) | 0.815 (0.716 to 0.914) | 0.783 (0.716 to 0.849) | 0.840 (0.787 to 0.892) | 0.569 (0.456 to 0.681) | 0.836 (0.780 to 0.892) |
| Support vector machine (RBF kernel) | 0.892 (0.851 to 0.934) | 0.547 (0.339 to 0.754) | 0.762 (0.646 to 0.878) | 0.752 (0.623 to 0.881) | 0.759 (0.653 to 0.864) | 0.821 (0.744 to 0.897) | 0.529 (0.356 to 0.703) | N/A |
| Random Forest | 0.922 (0.878 to 0.967) | 0.468 (0.316 to 0.621) | 0.738 (0.651 to 0.824) | 0.786 (0.664 to 0.908) | 0.748 (0.67 to 0.826) | 0.819 (0.762 to 0.876) | 0.500 (0.374 to 0.626) | N/A |
| Classification Algorithm K-NN | 0.857 (0.795 to 0.918) | 0.441 (0.352 to 0.531) | 0.713 (0.643 to 0.783) | 0.655 (0.525 to 0.785) | 0.697 (0.636 to 0.759) | 0.778 (0.727 to 0.828) | 0.420 (0.33 to 0.51) | N/A |
| Fitting Decision Tree Algorithm | 0.613 (0.513 to 0.714) | 0.703 (0.565 to 0.842) | 0.770 (0.652 to 0.888) | 0.529 (0.429 to 0.629) | 0.647 (0.560 to 0.745) | 0.682 (0.583 to 0.780) | 0.420 (0.295 to 0.545) | N/A |
| Naïve Bayes | 0.887 (0.787 to 0.986) | 0.379 (0.235 to 0.523) | 0.698 (0.617 to 0.779) | 0.680 (0.470 to 0.889) | 0.692 (0.603 to 0.781) | 0.780 (0.712 to 0.849) | 0.398 (0.259 to 0.537) | N/A |
| Support vector machine (polynomial kernel) | 0.938 (0.886 to 0.991) | 0.297 (0.184 to 0.410) | 0.684 (0.614 to 0.755) | 0.753 (0.588 to 0.918) | 0.694 (0.626 to 0.761) | 0.791 (0.737 to 0.844) | 0.377 (0.277 to 0.478) | N/A |
| Support vector machine (sigmoid kernel) | 0.699 (0.602 to 0.797) | 0.312 (0.177 to 0.447) | 0.622 (0.539 to 0.706) | 0.389 (0.260 to 0.517) | 0.553 (0.474 to 0.631) | 0.658 (0.575 to 0.741) | 0.229 (0.137 to 0.322) | N/A |

PPV, positive predictive value; NPV, negative predictive value; MCC, Matthews correlation coefficient; AUC, area under the curve; L-BFGS, Limited-memory Broyden–Fletcher–Goldfarb–Shanno; LIBLINEAR, Library for Large Linear Classification; SAG, stochastic average gradient; SAGA, stochastic average gradient améliore; RBF, Radial Basis Function; N/A, not available.

FIG. 2

| Network | Sensitivity (%) | Specificity (%) | PPV (%) | NPV (%) | Accuracy (%) | F1 | MCC | AUC | Skipped non-carcinoma cases (%) | Network Processing time (s) |
|---|---|---|---|---|---|---|---|---|---|---|
| Our proposed network | 91.1 | 80.6 | 65.6 | 95.7 | 83.7 | 0.760 | 0.679 | 0.933 | 19.37 | 9.077 |
| GCNet[1] | 94.4 | 71.2 | 57 | 96.9 | 77.9 | 0.711 | 0.61 | 0.943 | 53.60 | 57.869 |
| GastroFLOW[2] | 95.6 | 68.9 | 55.5 | 97.5 | 76.6 | 0.702 | 0.597 | 0.890 | 53.60 | 32.942 |

AUC, Area under the curve; PPV, Positive predictive value; NPV, negative predictive value; MCC, Matthews correlation coefficient.
[1] Inference with case WSIs only. [2] Inference with tile image only. [3] Inference with case WSIs, then inference with tile images from the cases with the prognosis as non-carcinoma.

FIG. 4

WEAKLY-SUPERVISED SYSTEM, METHOD AND WORKFLOW FOR PROCESSING WHOLE SLIDE IMAGE FOR DISEASE DETECTION

CROSS-REFERENCE TO RELATED APPLICATIONS

This application claims priority to, and the benefit of, U.S. Provisional Patent Application Ser. No. 63/366,019 filed Jun. 8, 2022, the disclosure of which is incorporated by reference herein in its entirety.

ABBREVIATIONS

AP anatomic pathology
AUC area under the receiver operating characteristic curve
CA carcinoma
CAD computer aided diagnosis
CNN convolutional neural network
GastroFLOW Gastric Specific Workflow Prioritization Network
GC gastric carcinoma
GCNet Gastric Carcinoma Classification Network
H&E hematoxylin and eosin
MCC Matthews correlation coefficient
MLT medical laboratory technologist
MLP multilayer perceptron
OD optical density
WSI whole slide image

TECHNICAL FIELD

The present disclosure relates to a weaky-supervised machine learning technique for predicting CA cases from WSIs and prioritizing suspicious CA cases from the WSIs.

BACKGROUND

Interest in the use of digital pathology continues to rise. Digital pathology is a subfield in pathology concerning acquisition, management, storage and interpretation of pathological information digitally. It is practiced in areas including clinical work such as telepathology, research and education. Histopathology is the discipline responsible for tissue diagnosis of disease. The tissue for diagnosis is mounted and stained on a glass slide for examination by pathologists. Digitization of stained tissue sections on glass slides has revolutionized the traditional practice of histopathology into a digital workflow using digitized images.

In Hong Kong, based on the 2016 population projection published by the Census and Statistics Department, it is foreseen that there will be an increasing rate of population aging in the coming two decades. It is expected that by 2038, there is a doubling in the number of elderly populations, representing one elderly in every three persons. Alongside, average life expectancy is projected to increase by five years in 2066 to 87 and 93 years of age in male and female, respectively. The overall low fertility, aging population and longer life expectancy would have potential effects on economic growth and affect how and where government expenditure is used especially in the area of health and welfare.

Cancer incidence in Hong Kong has been on a rise with an average rate of increase of 2.9% annually. Cancer incidence is much higher in the elderly population as aging is a major risk factor of cancer, and as aged people are more likely to have mutations in critical genes. With the rapid development of technology, it has enabled the opportunity for new molecular diagnostic tests for early cancer detection with increased sensitivity and specificity with reduced testing time. Moreover, it has also led to the development of personalized medicine with targeted therapies. All of these are good news for patients as it can reduce incidence and mortality rate with increased survival rates for cancer patients. However, all this comes at a price.

Cancer is a non-communicable disease. Prevention and screening of cancer, along with other non-communicable diseases, is a top priority in Hong Kong. Improved cancer screening has led to earlier diagnosis, surgical excision of tissue and prevention of cancer development. Many of the screening programmes in Hong Kong are subsidized by the government. By tackling risky behavior by lifestyle modification and increasing physical activity can prevent 40% of new cancers. Not only does prevention reduce the risk of invasive treatments to patients, but also it is a more cost-effective means for all NCD control which can save government expenditure to provide secondary and tertiary care. Prevention is the best cure for both patients and the government and can go a long way.

Histopathology remains the gold standard for many disease diagnoses. The increase in screening programmes and cancer patients has led to an overwhelming build-up of workload in the laboratory. A typical histopathology laboratory in Hong Kong processes a minimum of 35,000 cases with over 50,000 specimens. The laboratory handles a variety of tissues mainly to identify and diagnose CA. However, as diagnosis is made by pathologists, a worldwide shortage of pathologists has led to the pathologists being overwhelmed with increased number of cases. Their training and regulation on reporting has also contributed to increased time spent on reviewing each case, and the level of details required for each case is increasing. Knowledgeable and expert pathologists are at the age of retiring. MLTs play an important role in an anatomical pathology laboratory by preparing and processing the patient specimens to produce a quality tissue slide for disease diagnosis. The MLTs are also responsible for the laboratory workflow, daily operation, validation and standardization of new laboratory tests. However, the lack of MLTs means that the quality of work may be compromised by excessive workload, leading to a higher chance of human error. It also prevents necessary allocation of resources to laboratory development and sustainability. Furthermore, with COVID-19, certain countries may be in lock down and may limit the number of personnel in a hospital to prevent disease spreading. It has created many obstacles to efficiently run the laboratory to enable disease diagnosis by the pathologists.

Typically, in a traditional histopathology laboratory, prepared slides are placed in a slide tray with accompanied worksheets, which include patient information, are hand-delivered to the pathologists' pigeon holes for assessment. The distribution of slides in this manner helps distribute workload to multiple pathologists depending on specialty. The pathologists can roughly estimate their workload based on the height of slide trays stacked together.

In general, the slide trays are distributed to the pathologists based on the histopathology laboratory's preference. In some situations where specific specimens require extra attention, on-duty pathologists may request cases to be prioritized or set as urgent. The laboratory processes these cases first and allows the slide tray to be given to the on-duty pathologist first.

In the past decade, deep learning has emerged as a popular medical imaging technique to aid the pathologists in examining WSIs and diagnosing cancer [1], [2]. In particular, CNNs have shown excellent results in biomedical image analysis [3], [4]. However, training such neural networks usually requires heavy annotation at the pixel level by the pathologists [5], [6]. These annotations usually include identifying many pathological features, such as tissue structures, nuclear atypia and mitotic activity, to train a new deep neural network model [7], [8]. Due to the high clinical and laboratory workload, the generation of large reliable pathological datasets have become increasingly difficult, impeding effective development of deep learning applications for pathological analysis [9]. Therefore, relying on supervised learning for traditional development of deep neural network has become impractical. In contrast, weakly supervised learning may tackle cases that only require distinction between benign and malignant diagnoses [10]-[12]. However, current weakly supervised learning still requires a considerable scale of pixel level annotation [13]-[15], which is extremely time-consuming and tedious.

Manual annotation of large volume of data is impractical, expensive, tedious and time consuming. It can divert resources from clinical diagnosis and requires clinically relevant and normalized annotations performed by different pathologists.

It is desirable if the generation of training samples has a high degree of automation with least human involvement. Furthermore, it is desirable if examining a WSI and diagnosing cancer by means of deep learning can be maximized in performance by optimizing an architecture of deep-learning neural-network model with least human involvement too.

SUMMARY

The present disclosure provides a first computer-implemented method for processing a WSI to detect CA.

The first method comprises setting up a machine-learning model for classifying the WSI as a CA case or as a non-CA case. The machine-learning model is realized as a plurality of ensembled networks with a classification decision made by the machine-learning model according to a plurality of probabilities of having malignancy respectively generated by the plurality of ensembled networks. An individual ensembled network is realized as a MLP network configured by a plurality of hyperparameters. The plurality of hyperparameters is learnable. The machine-learning model is arranged to process a plurality of averaged cellular features for CA detection. An individual averaged cellular feature is a descriptive statistic of cells identified on the WSI, advantageously allowing a training dataset for training the machine-learning model and a testing dataset for verifying the trained machine-learning model to be constructed without a need to involve a costly annotation process of pixel-wise labelling each cell on a WSI training sample. The first method further comprises using the training and testing datasets to learn respective pluralities of hyperparameters for the plurality of ensembled networks and to train the plurality of ensembled networks.

Preferably, a plurality of descriptive statistics forming the plurality of averaged cellular features includes a plurality of statistical parameters regarding geometric dimensions of the identified cells and regarding optical densities of staining reagents applied to the identified cells.

In certain embodiments, the plurality of hyperparameters is selected from a group consisting of a choice of activation function, a choice of L2 regulation term, a dropout rate, a number of hidden layers, a shape of the hidden layers, a choice of last-neuron activation function, a choice of optimization algorithm, a choice of loss function, an epoch size and a batch size.

In certain embodiments, the plurality of ensembled networks consists of a predetermined number of ensembled networks. The respective pluralities of hyperparameters as learnt are optimized pluralities of hyperparameters such that the plurality of ensembled networks consists of the predetermined number of best-performing ensembled networks over a plurality of ensembled-network candidates contending for inclusion in the plurality of ensembled networks.

In certain embodiments, the predetermined number is selected to be an odd number. In certain embodiments, the predetermined number is 11.

In certain embodiments, the classification decision made by the machine-learning model is a majority vote of respective classification decisions made by the plurality of ensembled networks. The individual ensembled network makes a corresponding classification decision according to a corresponding probability of having malignancy generated by the individual ensembled network.

In certain embodiments, the machine-learning model makes the classification decision according to an average probability of having malignancy over the plurality of ensembled networks.

It is preferable that the first method further comprises predicting the CA case or the non-CA case from the WSI. The predicting of the CA case or the non-CA case from the WSI comprises: identifying a plurality of cells on the WSI; extracting a plurality of cellular features of different types for an individual cell, whereby respective pluralities of cellular features of different types are obtained for the plurality of cells; down-sampling the respective pluralities of cellular features of different types into the plurality of averaged cellular features, wherein an individual average cellular feature is obtained by averaging cellular features of a corresponding type in the respective pluralities of cellular features of different types; and using the trained machine-learning model to process the plurality of averaged cellular features to predict whether the plurality of cells identified on the WSI constitutes the CA case or the non-CA case.

In certain embodiments, the identifying of the plurality of cells on the WSI comprises using a watershed algorithm to segment the WSI into the plurality of cells.

In certain embodiments, the identifying of the plurality of cells on the WSI comprises using a CNN to segment the WSI into the plurality of cells after the CNN is trained.

In using the trained machine-learning model to process the plurality of averaged cellular features to predict the CA case or the non-CA case, the machine-learning model may compute an average probability of having malignancy over the plurality of ensembled networks as a malignancy prediction score for indicating a likelihood of presence of potential CA cells for the WSI. The average probability of having malignancy is computed according to the plurality of probabilities of having malignancy generated by the plurality of ensembled networks.

It is preferable that the first method further comprises prioritizing a suspicious CA case from the WSI after the non-CA case is predicted for the WSI. The prioritizing of the suspicious CA case from the WSI comprises: collecting a plurality of checked WSIs, an individual checked WSI being predicted to be the non-CA case; tiling the WSI and the plurality of checked WSIs to form a composite WSI; extracting a second plurality of average cellular features for the composite WSI; using the trained machine-learning model to process the second plurality of average cellular features instead of the plurality of average cellular features to thereby predict the CA case or the non-CA case for the composite WSI; responsive to predicting that the composite WSI is the CA case, changing a classification of the WSI from the non-CA case to the suspicious CA case; and responsive to classifying the WSI as the suspicious CA case, triaging the WSI for priority assessment of CA.

It is preferable that the first method further comprises generating a tumor probability heatmap of the WSI for facilitating visualization of potential CA regions on the WSI to assist pathological assessment of the WSI. The generating of the tumor probability heatmap comprises: identifying a plurality of cells on the WSI; extracting a plurality of cellular features of different types for an individual cell, whereby respective pluralities of cellular features of different types are obtained for the plurality of cells; using the trained machine-learning model to process the plurality of cellular features of different types instead of the plurality of averaged cellular features to thereby generate the plurality of probabilities of having malignancy so as to compute an average probability of having malignancy over the plurality of ensembled networks as a malignancy prediction score for indicating a likelihood that the individual cell is a potential CA cell, whereby a plurality of malignancy prediction scores is respectively generated for the plurality of cells; using a density estimation model to estimate a possible-CA cell density distribution over the WSI from the plurality of malignancy prediction scores; comparing the possible-CA cell density distribution against a low-risk threshold and a high-risk threshold to identify low-risk and high-risk regions containing CA, respectively; and generating the tumor probability heatmap according to the identified low-risk and high-risk regions.

In certain embodiments, the density estimation model is selected from a group consisting of a Gaussian model, a tophat model, an Epanechnikov model, an exponential model, a linear model and a cosine model.

The present disclosure also provides a second computer-implemented method for predicting one or more quality-control-related parameters in running a triage system used for diagnosing CA cases.

In the second method, a plurality of WSIs for CA detection is first prepared or acquired, wherein an individual WSI contains a plurality of cells. The individual WSI is processed to detect CA according to the first method that includes the step of predicting the CA case or the non-CA case from the WSI, and the step of prioritizing a suspicious CA case from the WSI after the non-CA case is predicted for the WSI. Thereby, the individual WSI is classified as a CA case, a non-CA case or a suspicious CA case. The processing of the individual WSI is repeated for the plurality of WSIs so as to divide the plurality of WSIs into a first plurality of WSIs classified as CA cases, a second plurality of WSIs classified as non-CA cases, and a third plurality of WSIs classified as suspicious CA cases. The triage system is then simulated with the first, second and third pluralities of classified WSIs as inputs to the triage system to predict the one or more quality-control-related parameters.

In certain embodiments, a first quality-control-related parameter selected from the one or more quality-control-related parameters is a percentage of non-CA cases for respective non-CA cases to be skipped by using the machine learning or deep learning algorithm-based triage system against under no case prioritization.

In certain embodiments, a second quality-control-related parameter selected from the one or more quality-control-related parameters is a possible time saved in diagnosing the plurality of WSIs by using the triage system against under no case prioritization.

In certain embodiments, a third quality-control-related parameter selected from the one or more quality-control-related parameters is a percentage of time for respective non-CA cases to be skipped by a pathologist or a related medical professional.

Other aspects of the present disclosure are disclosed as illustrated by the embodiments hereinafter.

BRIEF DESCRIPTION OF THE DRAWINGS

FIG. 2 provides a table for comparing performance values in an internal test cohort between the disclosed GCNet and some existing machine-learning techniques.

FIG. 4 provides a table showing model performance and clinical impact of GCNet and GastroFLOW on an external dataset, where the model performance of GCNet and GastroFLOW inferencing under different conditions was calculated for comparison on the external dataset.

Figure 1:
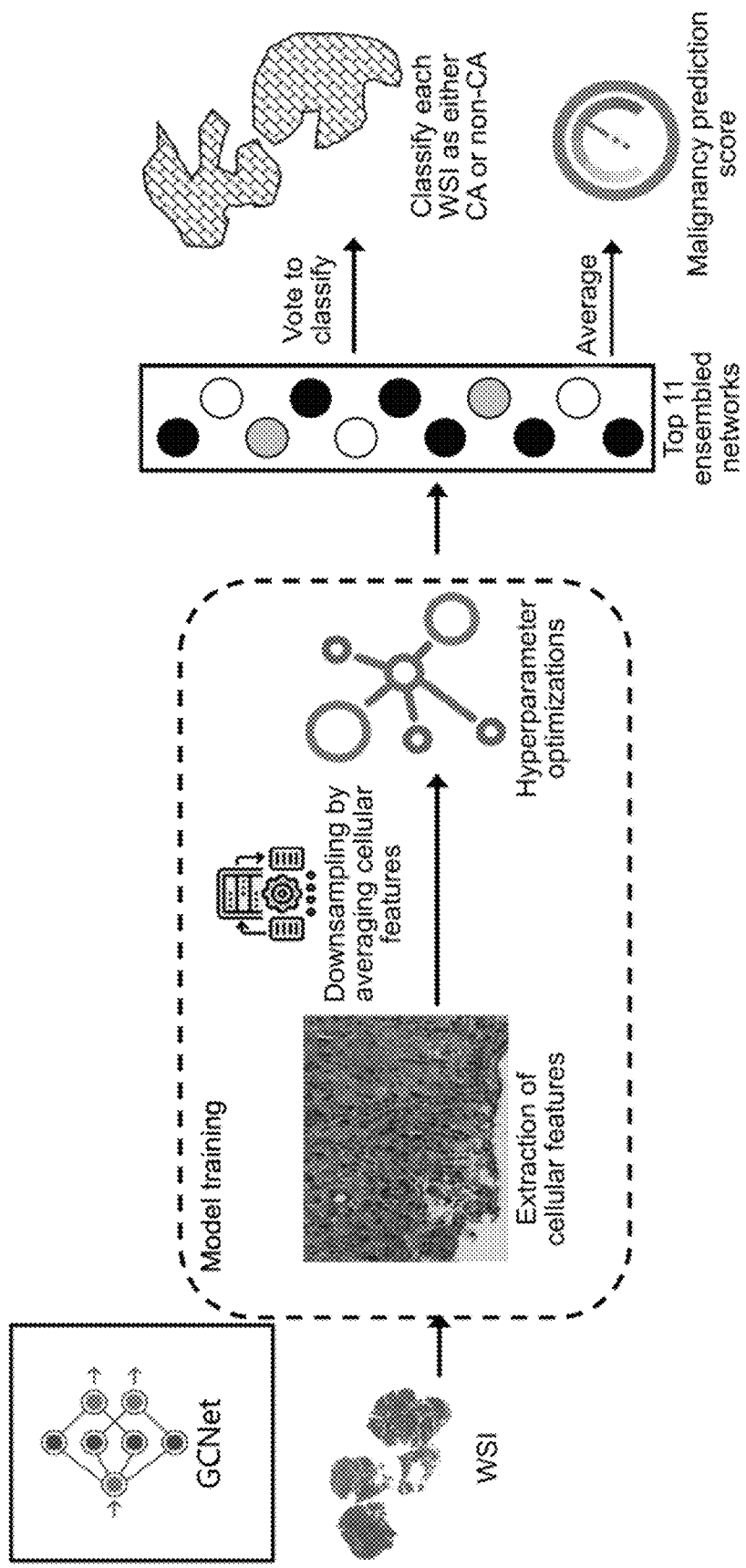
FIG. 1 depicts a schematic diagram of building and training GCNet in accordance with an exemplary embodiment of the present disclosure.

Skilled artisans will appreciate that elements in the figures are illustrated for simplicity and clarity and have not necessarily been depicted to scale.

DETAILED DESCRIPTION

As used herein, "a descriptive statistic" is a numerical summary of a data set. A descriptive statistic may be a brief informational coefficient of the data set. The most well-known descriptive statistic is a mean of the data set.

As used herein, "a composite image being formed by tiling plural component images" is a single image composed of plural sub-images non-overlappingly laid within a boundary of the single image, where an individual sub-image is a corresponding component image. Usually, the sub-images are arranged as a rectangular array of sub-images, a row of sub-images, or a column of sub-images.

The present disclosure is concerned with a weakly supervised machine-learning technique for predicting and prioritizing CA cases, such as GC for histopathological analysis. Unlike training a conventional CNN, the technique can triage WSIs of suspicious CA cases for priority assessment without training with considerable scale of pixel level annotation annotated by medical experts. The weakly supervised technique is based on clinically relevant and biologically interpretable cellular features extracted from related WSI with classifying CA cases using clinical diagnosis information, which is accessible from pathology laboratory information systems or electronic health records from hospital archives. This process enables significant time saving without requiring expert annotation.

According to a first aspect of present disclosure, the weakly supervised technique firstly down-samples raw WSI data into several clinically significant and biologically interpretable cellular features. It will be assessed with cell morphology to look for the presence or prevalence of potential carcinoma cells. The cellular features include but not limited to descriptive statistics on basic geometry of cells and on OD of different staining reagents applied to the cells. An example list of cellular features extracted from the WSI is given by LIST1.

LIST1: (1) nucleus, area; (2) nucleus, perimeter; (3) nucleus, circularity; (4) nucleus, max Fert diameter; (5) nucleus, min Fert diameter; (6) nucleus, eccentricity; (7) nucleus, hematoxylin OD mean; (8) nucleus, hematoxylin OD sum; (9) nucleus, hematoxylin OD standard deviation; (10) nucleus, hematoxylin OD max; (11) nucleus, hematoxylin OD min; (12) nucleus, hematoxylin OD range; (13) nucleus, eosin OD mean; (14) nucleus, eosin OD sum; (15) nucleus, eosin OD standard deviation; (16) nucleus, eosin OD max; (17) nucleus, eosin OD min; (18) nucleus, eosin OD range; (19) cell, area; (20) cell, perimeter; (21) cell, circularity; (22) cell, max caliper; (23) cell, min caliper; (24) cell, eccentricity; (25) cell, hematoxylin OD mean; (26) cell, hematoxylin OD standard deviation; (27) cell, hematoxylin OD max; (28) cell, hematoxylin OD min; (29) cell, eosin OD mean; (30) cell, eosin OD standard deviation; (31) cell, eosin OD max; (32) cell, eosin OD min; (33) cytoplasm, hematoxylin OD mean; (34) cytoplasm, hematoxylin OD standard deviation; (35) cytoplasm, hematoxylin OD max; (36) cytoplasm, hematoxylin OD min; (37) cytoplasm, eosin OD mean; (38) cytoplasm, eosin OD standard deviation; (39) cytoplasm, eosin OD max; (40) cytoplasm, eosin OD min; (41) nucleus/cell area ratio.

A second aspect of the present disclosure is concerned with identifying and prioritizing cases with CA, such as GC. By assuming all cells to be homogeneous within each stained WSI, a GCNet is built. FIG. 1 depicts a schematic diagram of building and training GCNet in accordance with an exemplary embodiment of the present disclosure. An ensemble of optimized MLP networks [16]-[18] for binary classification training based on averaged cellular features (each obtained by averaging cellular features of the same type over all the cells on the WSI) to classify the WSI as either CA or non-CA. For optimization of the MLP networks, hyperparameters including activation function, L2 regulation, dropout rate, number of hidden layers, shape of the hidden layers, last neuron activation function, choice of optimization algorithm, choice of loss function, epoch size and batch size are needed for automatic tuning. After hyperparameter optimization, the multiple MLP networks are trained with a criterion of fulfilling an accuracy requirement of above 0.85 for an internal validation and internal testing set. To ensure model generalizability of the MLP networks, a number of optimized MLP networks with top AUC or MCC may be selected for forming an optimized MLP network. With the generated average malignancy prediction score generated from the ensemble of optimized MLP networks, we can classify each WSI as either CA or non-CA by setting different threshold to map probabilities to class labels.

For instance, the weakly supervised technique disclosed herein trains the MPL network models with averaged cellular features of each case labelled according to clinical diagnosis reports. Once the machine-learning algorithms for identifying and prioritizing cases with CA are learned (artificial neural networks, supporting vector machine, logistic regression, etc.), the technique can possibly classify the WSI as either CA or non-CA. For system quality control for the algorithms for identifying and prioritizing cases, it can be assessed by predictive matric, e.g., sensitivity, specificity, positive predictive value, negative predictive value, accuracy, F1 score, MCC, AUC, etc. AUC and MCC can be primary indicators to assess model generalisability.

FIG. 2 provides a table for comparing performance values in an internal test cohort between the disclosed GCNet and some existing machine-learning techniques. The cross-validation was done by using an internal dataset. The 10-fold average performance for sensitivity, specificity, PPV, NPV, accuracy, F1 Score, MCC and AUC were generated and reported for each fold (n=130/per fold). The performance of GCNet was compared with the seven commonly used machine-learning algorithms. Results in the table are shown as the mean±95% confidence interval from the ten testing sets. It is apparent that the GCNet outperforms most of the existing techniques in many performance-comparison metrics, such as specificity and accuracy.

Figure 3:
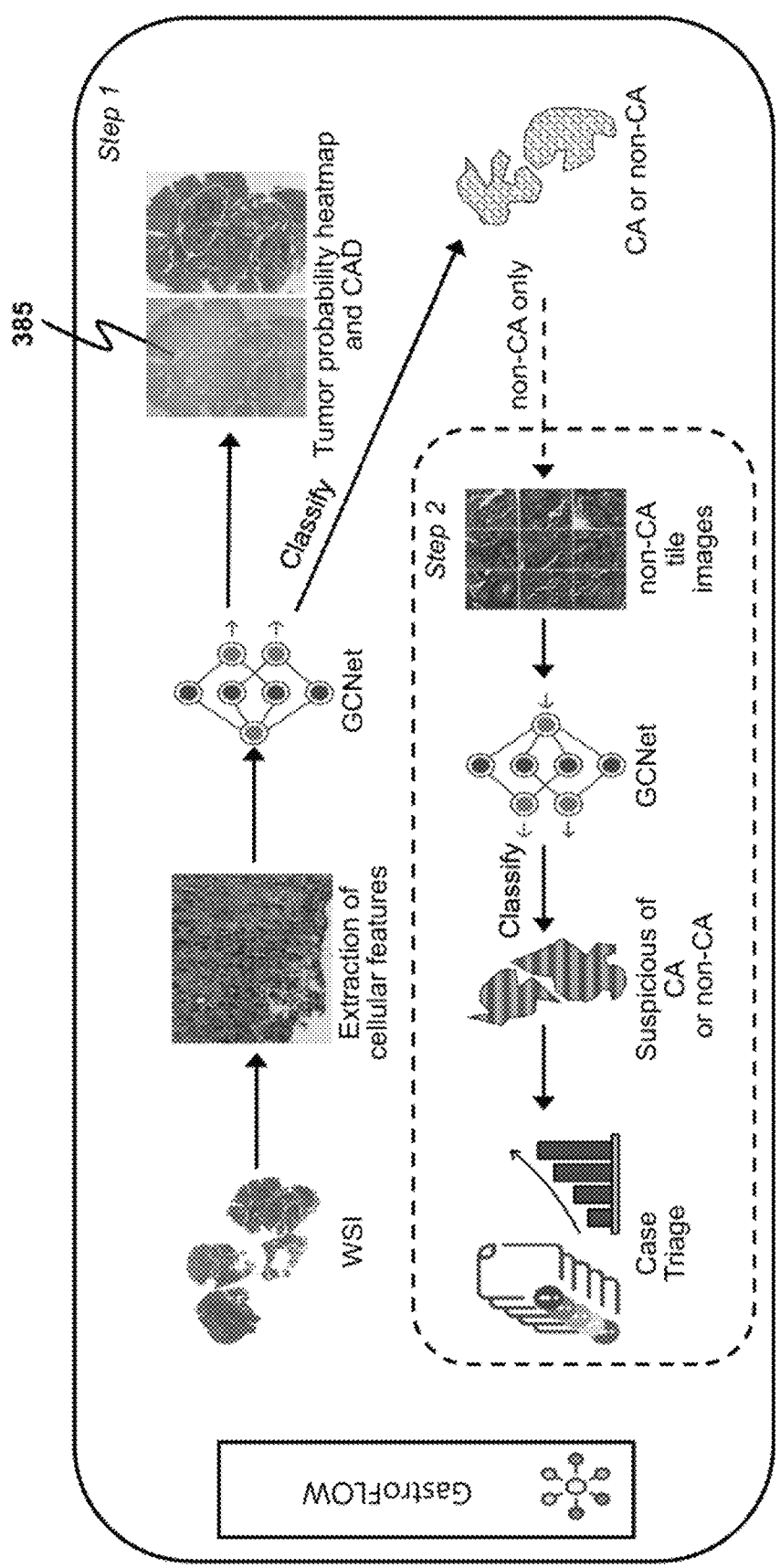
FIG. 3 depicts a schematic diagram of building GastroFLOW, which is used for screening GC cases in histology with deep learning, in accordance with an exemplary embodiment of the present disclosure.

A third aspect of the present disclosure is concerned with an optimization strategy of GCNet to build a weakly supervised annotation-free system, GastroFLOW. GastroFLOW is used in screening GC cases in histology with deep learning. FIG. 3 depicts a schematic diagram of GastroFLOW in accordance with an exemplary embodiment of the present disclosure. GastroFLOW is designed with a failsafe to reduce the chance of false negative by allowing WSIs of non-CA classified cases to be tiled and reassessed. First, the GCNet is used to predict CA cases and non-CA cases from plural WSIs. It is noticed that some of real CA cases has low tumor volume and are thus falsely classified as non-CA cases. Therefore, with an aim of identifying potential CA cases from non-CA cases classified initially by the GCNet, tile images of negative cases are checked again by using the GCNet. Finally, GastroFLOW generates a triage list of gastric biopsy cases labelled as 'carcinoma', 'suspicious for carcinoma' and 'benign'. Subsequently, the cases are further sorted by their prediction scores according to the probability of having malignancy. As a result, GCNet ranks each WSI and assigns a malignancy prediction score thereto based on a CA expectation of the WSI to case-level diagnosis. Based on this strategy, it can also be applied to other tissue biopsy prioritization. Similar to system quality control for the algorithms for identifying and prioritizing cases, it can be assessed by predictive matric (e.g., sensitivity, specificity, positive predictive value, negative predictive value, accuracy, F1 score, MCC, and AUC, etc.).

FIG. 4 provides a table showing model performance and clinical impact of GCNet and GastroFLOW on an external dataset. The model performance of GCNet and GastroFLOW inferencing under different conditions was calculated for comparison on the external dataset. Percentage of skipped non-CA cases demonstrate triage efficiency of model. AUC and MCC can be used to assess model generalisability. The results in FIG. 4 indicate that GastroFLOW achieves high accuracy (>0.75), low false negative rate (0.044) and (>50%) decent ability to skip non-CA cases.

A fourth aspect of the present disclosure is concerned with generation of CAD as an additional assistant tool for pathological assessment. As GCNet is also able to generate a prediction score for each cell to estimate the cellular malignancy in each WSI, it can estimate a possible carcinoma cell density via using one of several density estimation algorithms that include, but not limited to, Gaussian, tophat, Epanechnikov, exponential, linear and cosine models. GCNet can generate relative tumor probability heatmap 385 for each WSI as shown in FIG. 3. Relative to each WSI, different thresholds (such as 0.75 and 0.9) as the relative malignancy indexes can be used to contour the low and high-risk regions containing CA as CAD images for facilitating visualization of potential CA regions in WSI. Using this strategy, it can also be applied to other tissue biopsy significant histology visualization.

Figure 5:
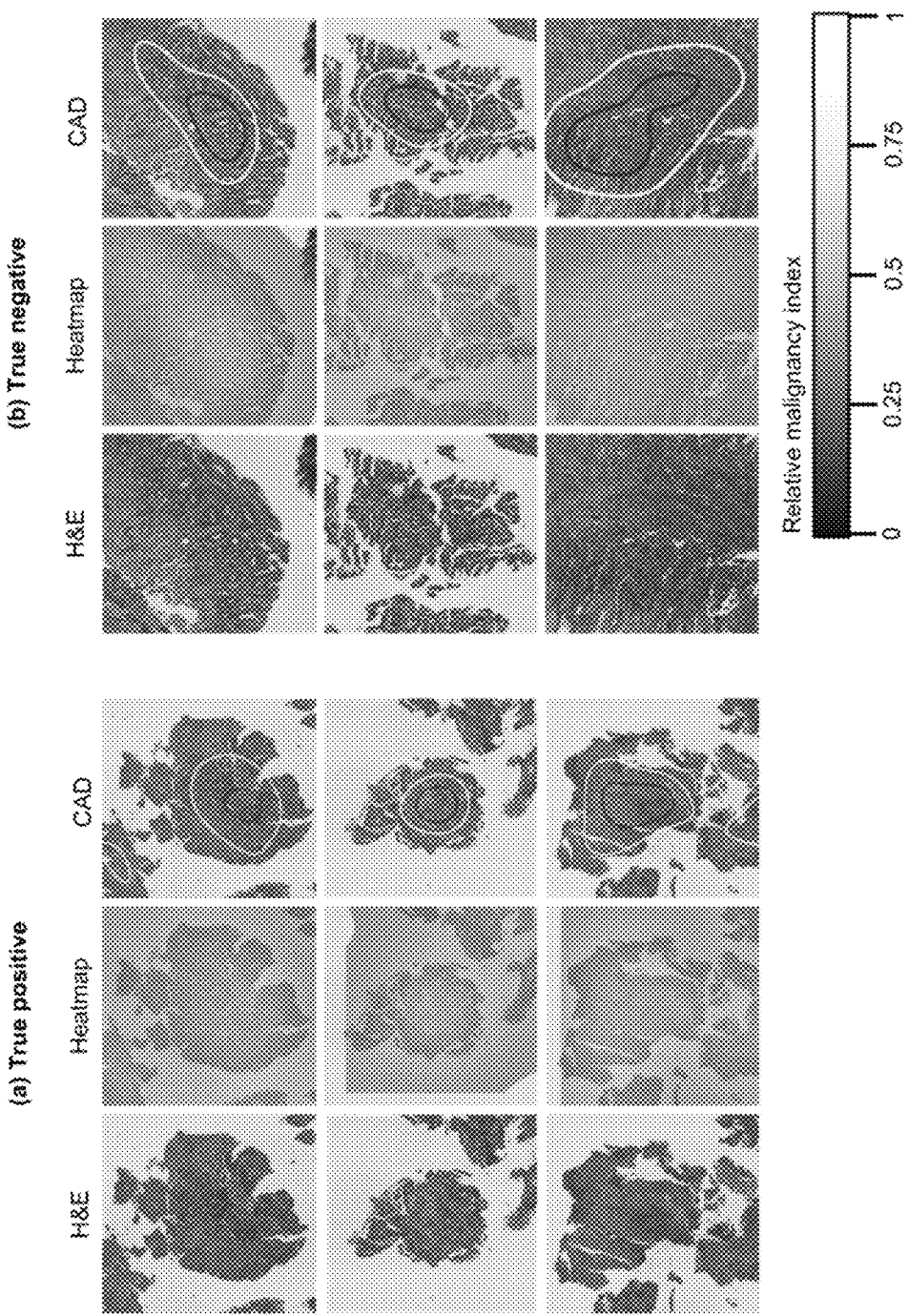
FIG. 5 illustrates model introspection and pathology analysis of the misclassification errors, where subplots (a), (b), (c) and (d) show results for a true positive case, a true negative case, a false positive case and a false negative case, respectively.
Figure 5:
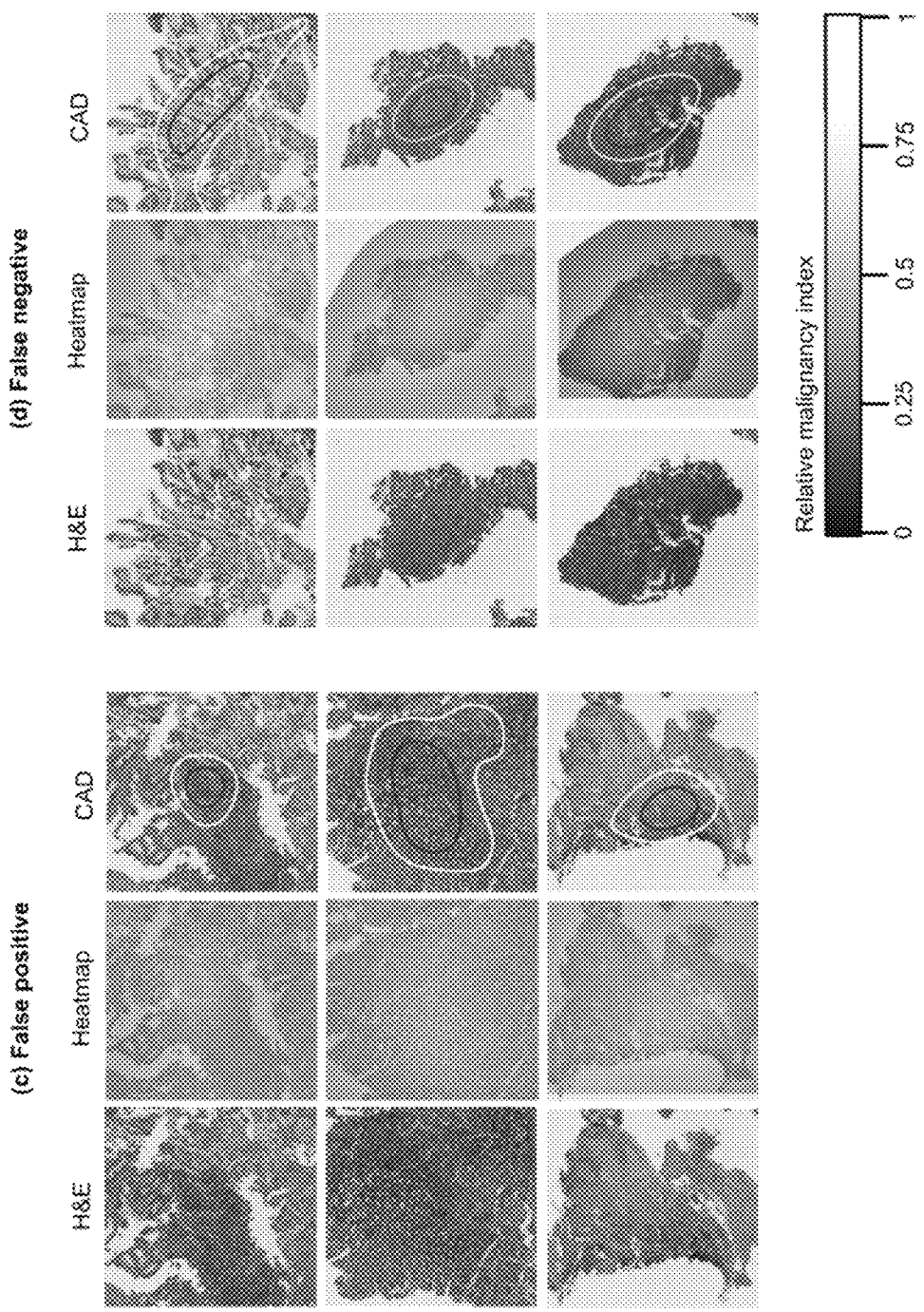

FIG. 5 illustrates model introspection and pathology analysis of the misclassification errors. The top ranked true positive and true negative as well as false positive and false negative WSIs using GastroFLOW on the external dataset are represented with their corresponding H&E, tumour probability heatmap and CAD with contour. Subplots (a) and (b) depict cases of correct classifications whereas subplots (c) and (d) depict cases of misclassification. In subplot (a), CAD highlights GC regions in true positive cases, such as intestinal-type GC, poorly-cohesive CA and tumour cells in ulcerated areas. In subplot (b), which shows true negative biopsies, CAD emphasizes the most suspicious areas among negative cells, which are cells with minimally enlarged or hyperchromatic nuclei due to variations in preparation. In subplot (c), CAD emphasizes an area of benign body-type gastric mucosa with slightly darker nuclei and areas of lymphocytic aggregates in biopsies with false positive prediction. In biopsies with false negative prediction as shown in subplot (d), CAD highlights well-differentiated intestinal-type adenocarcinoma with only mild to moderate atypia.

A fifth aspect of the present disclosure is concerned with system quality control before implementation in clinical setting. Instead of histopathological model (or networks) building to predict and prioritize CA cases, triage systems for histopathological cases' prioritization have been required to be implemented through simulated clinical setting with a group of pathologists before triage system implementation. For instance, a randomized and double-blind study can be conducted to estimate a length of possible time saved in diagnosing all CA cases under no case prioritization against using any triage system. Furthermore, through a randomized and double-blind study, one can also compare theoretical (internal validation, internal testing or external validation) and actual impact of triage system on clinical practice through the percentage of time for non-CA or other medical defined benign cases can be skipped by pathologists or other related medical professionals, as demonstrated by FIGS. 6 and 7.

Figure 6:
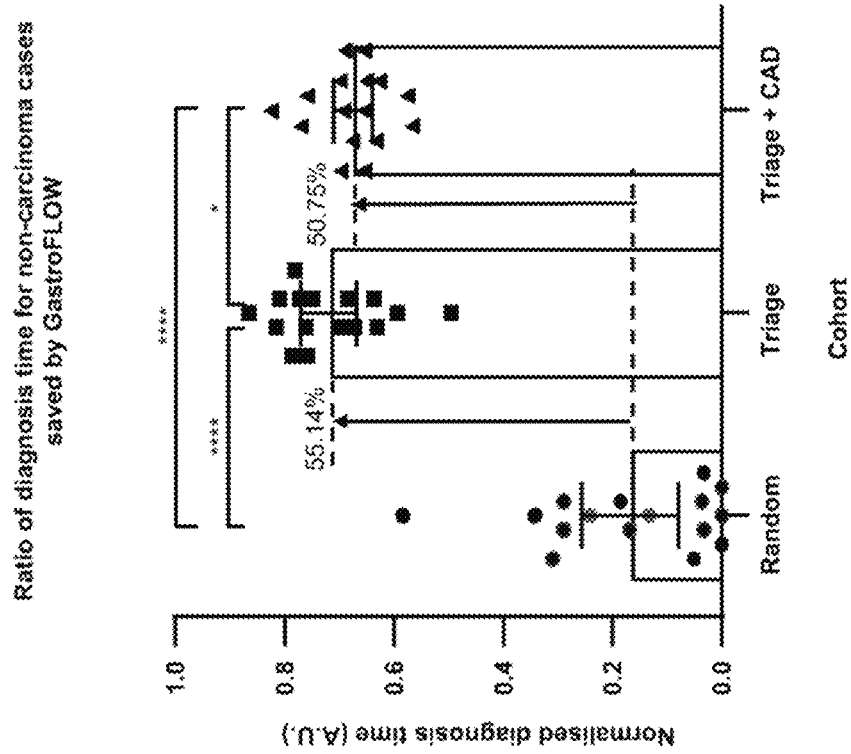
FIG. 6 plots a first set of results obtained in clinical evaluation of GastroFLOW in case prioritization on pathologist workflow and efficiency, where GastroFLOW was evaluated in a semi-digital AP laboratory on the retrospective dataset with multi-centre pathologists' participation.
Figure 7:
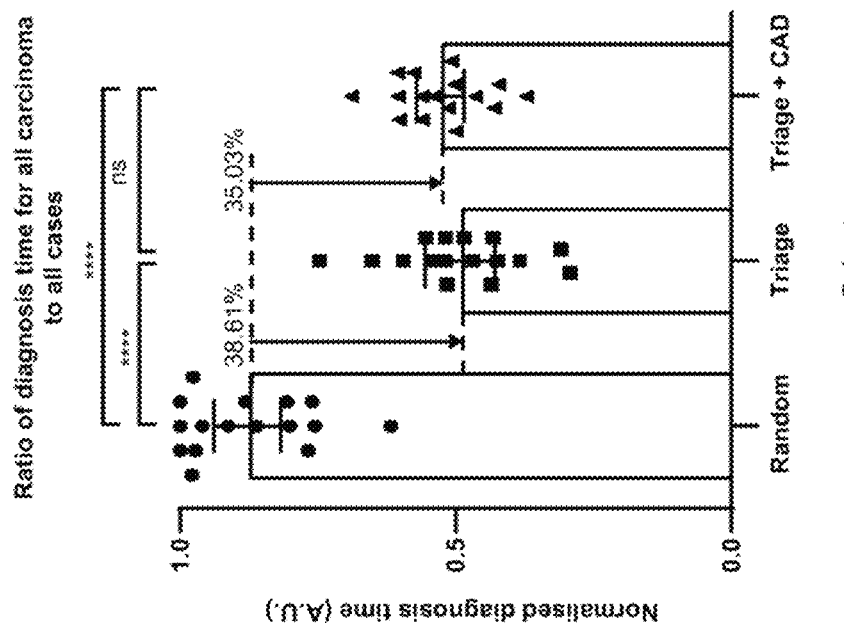
FIG. 7 plots a second set of results obtained in clinical evaluation of GastroFLOW in case prioritization on pathologist workflow and efficiency, where GastroFLOW was evaluated in a semi-digital AP laboratory on the retrospective dataset with multi-centre pathologists' participation.

In each of FIGS. 6 and 7, it is plotted with results obtained in clinical evaluation of GastroFLOW in case prioritization on pathologist workflow and efficiency. GastroFLOW was evaluated in a semi-digital AP laboratory on the retrospective dataset with multi-centre pathologists' participation. In FIG. 6, to reduce the impact of individual differences in the data for comparison, the ratio of diagnosis time of all CA cases to total time to diagnose each set per pathologist was calculated. In FIG. 7, the ratio of total non-CA diagnosis time to total diagnosis time saved by GastroFLOW was calculated by the total diagnosis time of non-CA cases after the last diagnosed CA case from each set divided by the sum of the non-CA case diagnosis time in each set. By allowing all non-CA (was benign) cases for automatic diagnosis, it could potentially allow a pathologist to skip a net of 50.75-55.14% non-CA case diagnosis time whilst retaining 100% sensitivity.

Figure 8:
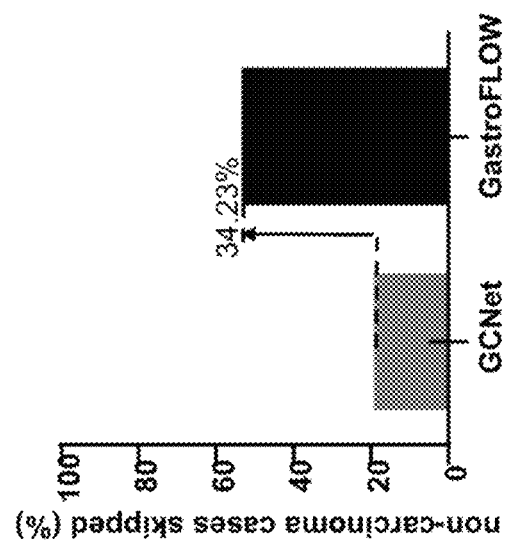
FIG. 8 shows the model performance of GCNet and GastroFLOW inferencing under different conditions, where the model performance was calculated for comparison on an external dataset.

Through our double-blind study, we found 44.44% workload reduction given the prevalence (33.33%) of Gastric CA. Furthermore, we found that GastroFLOW skipped 66.60% of non-CA case diagnosis time, as shown in FIG. 7. It agrees with the expected value of workload in external dataset, as shown in FIG. 8, which shows the theoretical ratio of non-CA cases skipped after prioritization by GastroFLOW using one external validation dataset. The theoretical ratio was calculated by dividing the total number of non-CA cases after the last CA case by the sum of all non-CA number of cases in each set. Compared to random scenario that the sorting of cases following chronological order, GastroFLOW can save 55.14% of time to diagnose all non-CA cases after CA cases got diagnosed.

Embodiments of the present disclosure are elaborated as follows based on the details, examples, applications, etc., of GCNet and GastroFLOW as disclosed above in combination with common technical knowledge known in the art.

The present disclosure provides a computer-implemented method for processing a WSI to detect CA. The WSI is also a histological image containing cells. The disclosed method is a machine-learning-based technique. Although the disclosed method is developed based on GCNet and GastroFLOW, the latter two networks being specifically targeted for GC, the disclosed method is not limited only to applications to detect GC. The disclosed method may be used to detect any type of cancer from the WSI.

Figure 9:
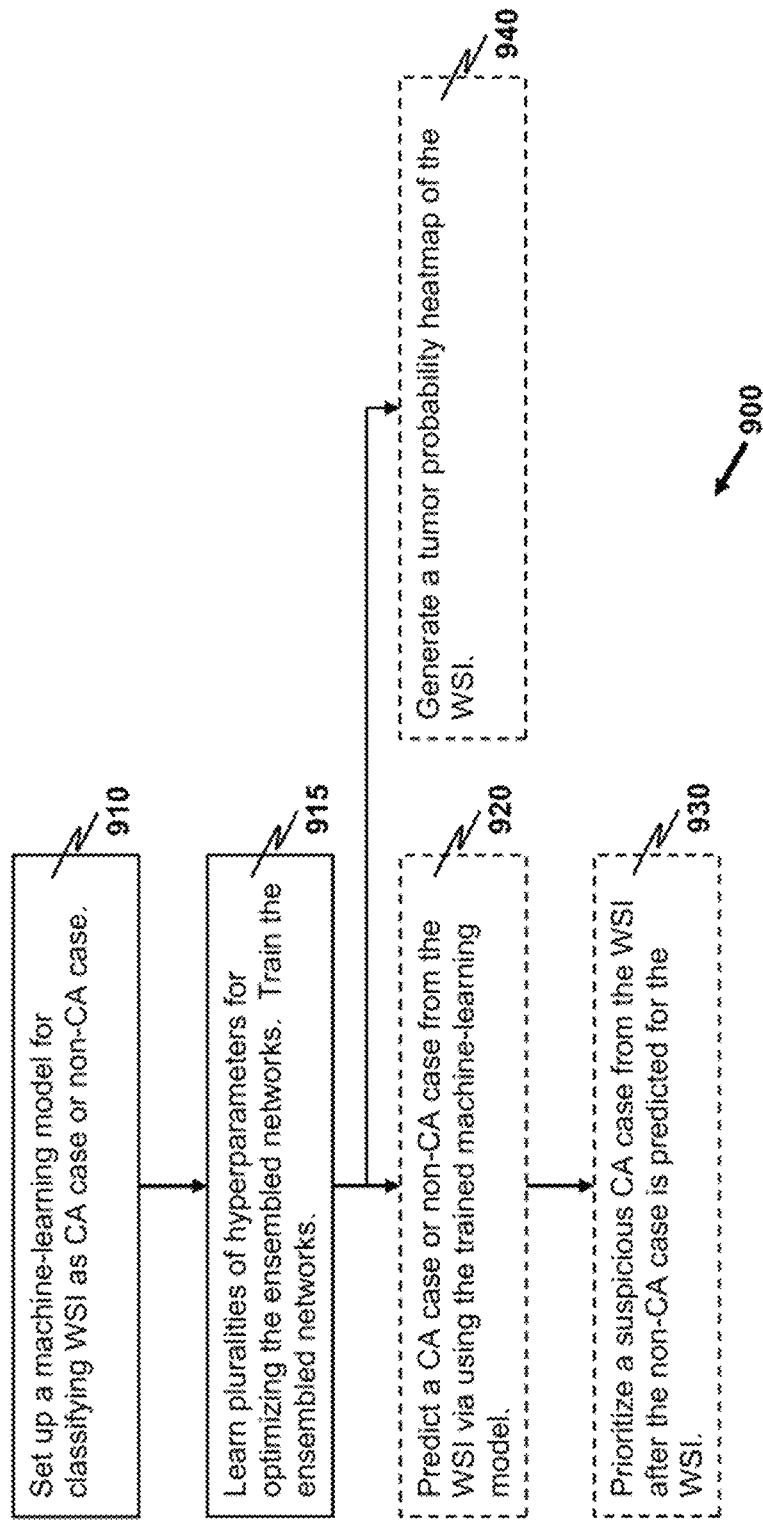
FIG. 9 depicts a flowchart for exemplarily illustrating a first computer-implemented method for processing a WSI to detect CA as disclosed herein in the present disclosure.

The disclosed method is illustrated with the aid of FIG. 9, which depicts a flowchart showing exemplary steps of a first method 900 for processing the WSI to detect CA. Exemplarily, the first method 900 comprises steps 910 and 915.

In the step 910, a machine-learning model for classifying the WSI as a CA case or as a non-CA case is set up. The machine-learning model is realized as a plurality of ensembled networks with a classification decision made by the machine-learning model according to a plurality of probabilities of having malignancy respectively generated by the plurality of ensembled networks. An individual ensembled network is realized as a MLP network configured by a plurality of hyperparameters. The plurality of hyperparameters is learnable. In particular, the machine-learning model is arranged to process a plurality of averaged cellular features for CA detection. An individual averaged cellular feature is a descriptive statistic of cells identified on the WSI. Advantageously, using the machine-learning model to process a plurality of descriptive statistics of cells allows a training dataset for training the machine-learning model and a testing dataset for verifying the trained machine-learning model to be constructed without a need to involve a costly annotation process of pixelwise labelling each cell on a WSI training sample.

In the step 915, the training and testing datasets are used to learn respective pluralities of hyperparameters for the plurality of ensembled networks and to train the plurality of ensembled networks. As a result, the machine-learning model is trained and is ready for making inference.

As mentioned above, the plurality of hyperparameters may be selected from a group consisting of a choice of activation function, a choice of L2 regulation term, a dropout rate, a number of hidden layers, a shape of the hidden layers, a choice of last-neuron activation function, a choice of optimization algorithm, a choice of loss function, an epoch size and a batch size.

In certain embodiments, the plurality of ensembled networks consists of a predetermined number of ensembled networks. The respective pluralities of hyperparameters as learnt are optimized pluralities of hyperparameters such that the plurality of ensembled networks consists of the predetermined number of best-performing ensembled networks over a plurality of ensembled-network candidates contending for inclusion in the plurality of ensembled networks. The predetermined number may be selected to be an odd number. As mentioned above, the predetermined number may be selected to be 11.

In one option, the classification decision made by the machine-learning model is a majority vote of respective classification decisions made by the plurality of ensembled networks, where the individual ensembled network makes a corresponding classification decision according to a corresponding probability of having malignancy generated by the individual ensembled network. In another option, the machine-learning model makes the classification decision according to an average probability of having malignancy over the plurality of ensembled networks. Other options are possible.

Preferably, a plurality of descriptive statistics forming the plurality of averaged cellular features includes a plurality of statistical parameters regarding geometric dimensions of the identified cells and regarding optical densities of staining reagents applied to the identified cells. One example of the aforementioned plurality of statistical parameters is given by LIST 1 above.

In certain embodiments, the machine-learning model is GCNet.

Figure 10:
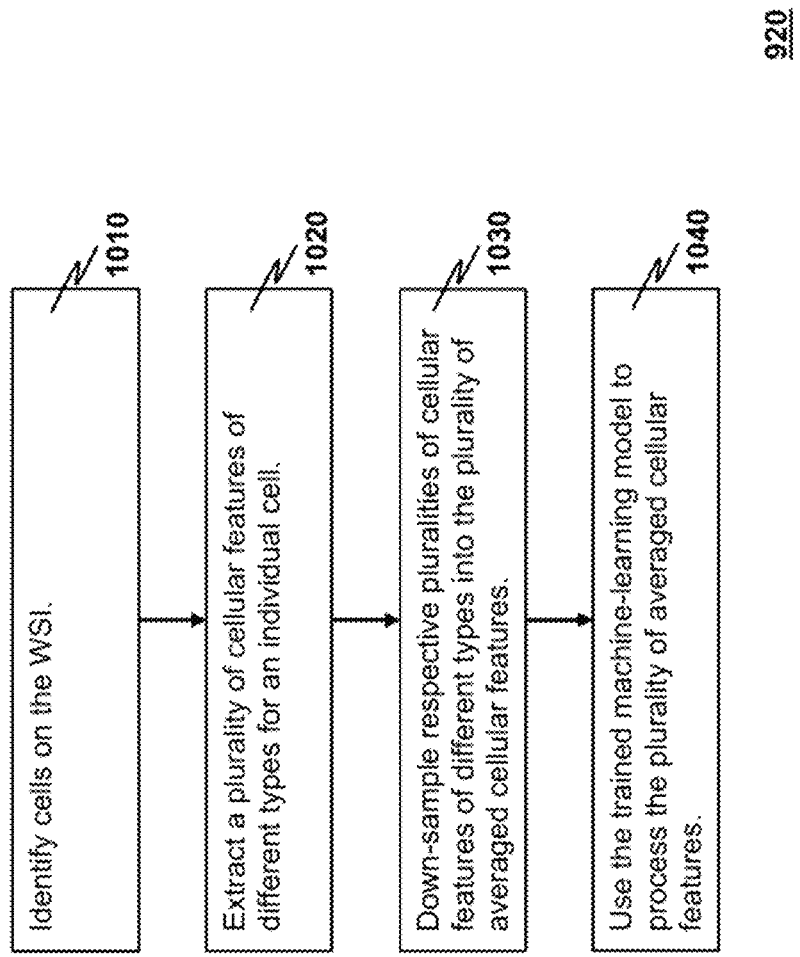
FIG. 10 depicts a flowchart showing an exemplary workflow, as used in the disclosed first method, for accomplishing a step of predicting a CA case or a non-CA case from the WSI.

Preferably, the first method 900 further comprises a step 920 of predicting the CA case or the non-CA case from the WSI as seen from FIG. 9. FIG. 10 depicts a flowchart showing exemplary steps taken for accomplishing the step 920. Exemplarily, the step 920 comprises steps 1010, 1020, 1030 and 1040. First, a plurality of cells on the WSI is identified in the step 1010. A plurality of cellular features of different types for an individual cell is extracted in the step 1020. As a result, respective pluralities of cellular features of different types are obtained for the plurality of cells. In the step 1030, the respective pluralities of cellular features of different types are down-sampled into the plurality of averaged cellular features, where an individual average cellular feature is obtained by averaging cellular features of a corresponding type in the respective pluralities of cellular features of different types. Afterwards, the trained machine-learning model is used in the step 1040 to process the plurality of averaged cellular features to predict whether the plurality of cells identified on the WSI constitutes the CA case or the non-CA case.

In certain embodiments, the step 1010 of identifying the plurality of cells on the WSI comprises using a watershed algorithm to segment the WSI into the plurality of cells. Alternatively, a CNN may be used in the step 1010 to segment the WSI into the plurality of cells after the CNN is trained. Those skilled in the art will appreciate that certain CNN models known in the art for medical image segmentation, e.g., U-Net and its variants, may be selected to implement the CNN for the step 1010.

In the step 1040 of using the trained machine-learning model to process the plurality of averaged cellular features to predict the CA case or the non-CA case, the machine-learning model may additionally compute an average probability of having malignancy over the plurality of ensembled networks as a malignancy prediction score for indicating a likelihood of presence of potential CA cells for the WSI. The average probability of having malignancy is computed according to the plurality of probabilities of having malignancy generated by the plurality of ensembled networks.

Figure 11:
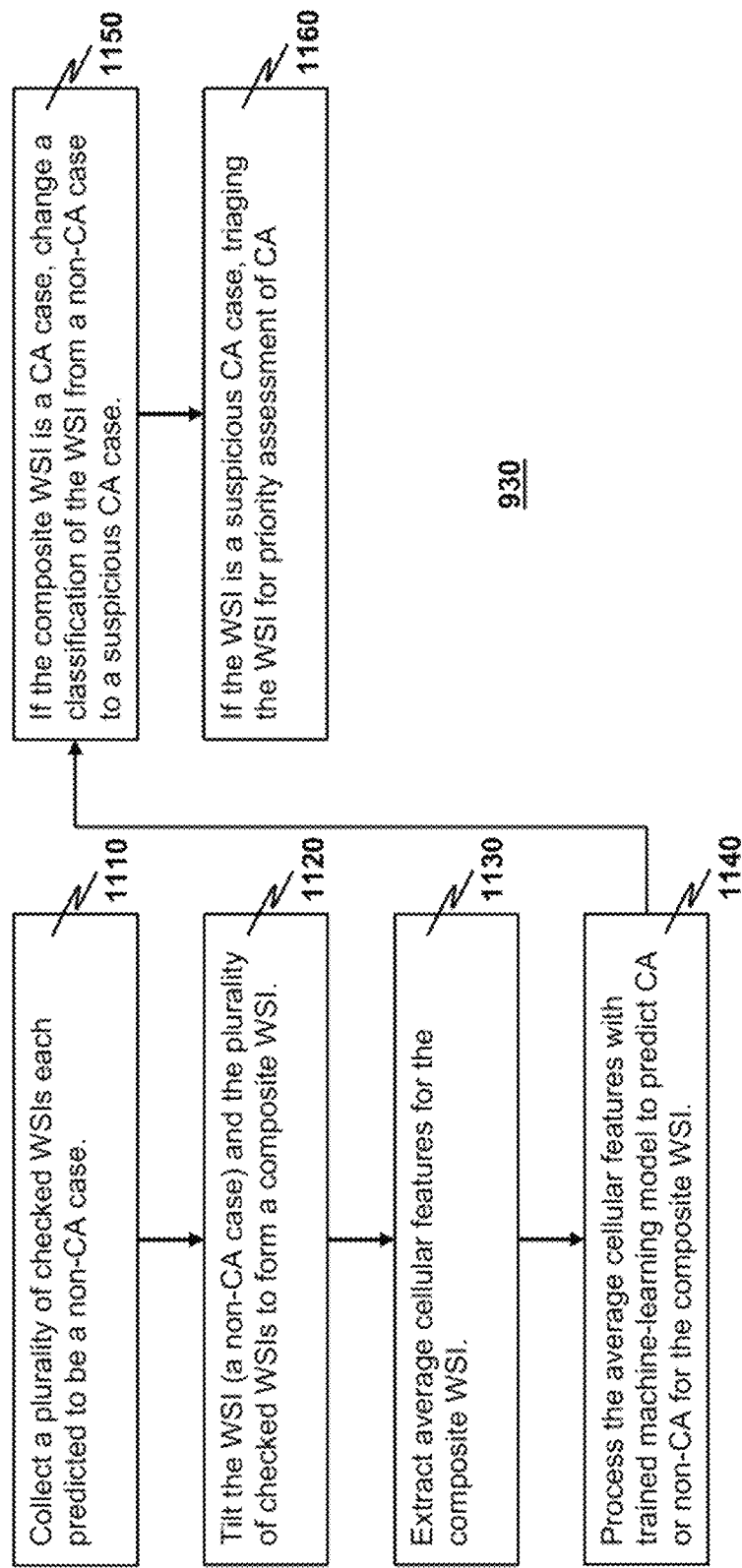
FIG. 11 depicts a flowchart showing an exemplary workflow, as used in the disclosed first method, for accomplishing a step of prioritizing a suspicious CA case from the WSI after the non-CA case is predicted for the WSI.

Preferably, the first method 900 further comprises a step 930 of prioritizing a suspicious CA case from the WSI after the non-CA case is predicted for the WSI as seen from FIG. 9. FIG. 11 depicts a flowchart showing exemplary steps taken for accomplishing the step 930. Exemplarily, the step 930 comprises steps 1110, 1120, 1130, 1140, 1150 and 1160. In the step 1110, a plurality of checked WSIs is collected, where an individual checked WSI is predicted by the trained machine-learning model to be the non-CA case. After the plurality of checked WSIs is collected, a composite WSI is formed in the step 1120 by tiling the WSI and the plurality of checked WSIs. A second plurality of average cellular features is then extracted for the composite WSI in the step 1130. In the step 1140, the trained machine-learning model is used to process the second plurality of average cellular features instead of the plurality of average cellular features to thereby predict the CA case or the non-CA case for the composite WSI. In the step 1150, if the composite WSI is predicted to be the CA case, a classification of the WSI is changed from the non-CA case to the suspicious CA case. In the step 1160, if the WSI is classified as the suspicious CA case, the WSI is triaged for priority assessment of CA. Note that by the arrangement provided by the steps 1150 and 1160, if the composite WSI is predicted to be the CA case, the individual checked WSI is reclassified form the non-CA case to the suspicious CA case so that the individual checked WSI is triaged for priority assessment of CA.

In certain embodiments, the machine-learning model is GastroFLOW.

Figure 12:
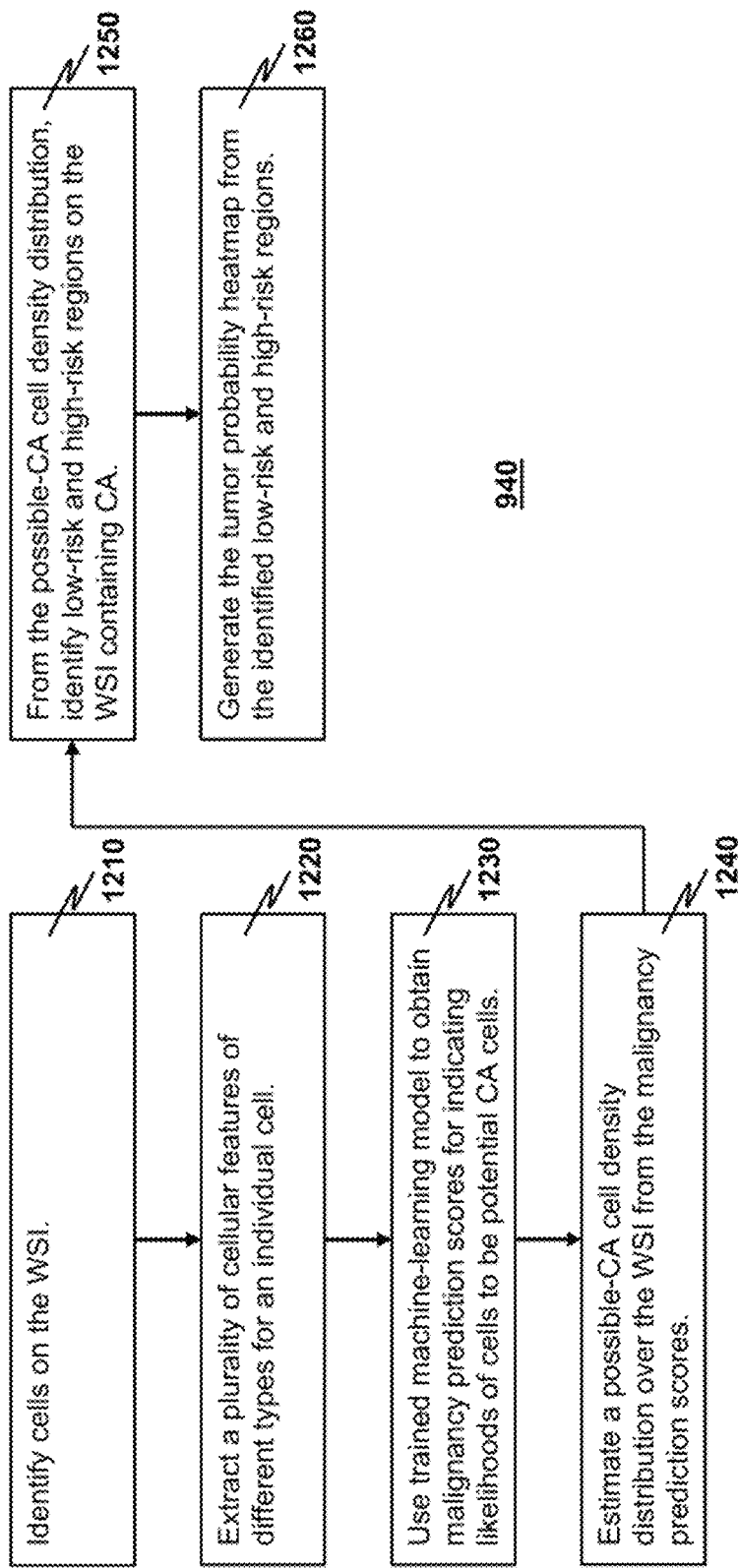
FIG. 12 depicts a flowchart showing an exemplary workflow, as used in the disclosed first method, for accomplishing a step of generating the tumor probability heatmap of the WSI for facilitating visualization of potential CA regions on the WSI to assist pathological assessment of the WSI.

Apart from predicting the CA case and prioritizing the suspicious CA case as in the steps 920 and 930, the trained machine-learning model may also be used to generate a tumor probability heatmap of the WSI. In this regard, the first method 900 includes a step 940 of generating the tumor probability heatmap of the WSI for facilitating visualization of potential CA regions on the WSI to assist pathological assessment of the WSI as seen from FIG. 9. FIG. 12 depicts a flowchart showing exemplary steps taken for accomplishing the step 940. Exemplarily, the step 930 comprises steps 1210, 1220, 1230, 1240, 1250 and 1260.

In the step 1210, a plurality of cells on the WSI is identified. In the step 1220, a plurality of cellular features of different types for an individual cell is extracted. As a result, respective pluralities of cellular features of different types are obtained for the plurality of cells. Note that the steps 1210 and 1220 are same as, or equivalent to, the steps 1010 and 1020, respectively.

After the steps 1210 and 1220 are accomplished, the trained machine-learning model is used in the step 1230 to process the plurality of cellular features of different types instead of the plurality of averaged cellular features to thereby generate the plurality of probabilities of having malignancy. As the plurality of probabilities of having malignancy is generated, in the step 1230, an average probability of having malignancy, which is obtained by averaging over the plurality of ensembled networks, is computed. The average probability of having malignancy is used as a malignancy prediction score for indicating a likelihood that the individual cell is a potential CA cell. As a result, a plurality of malignancy prediction scores is respectively generated for the plurality of cells in the step 1230.

After the plurality of malignancy prediction scores is generated, a density estimation model is used in the step 1240 to estimate a possible-CA cell density distribution over the WSI from the plurality of malignancy prediction scores. As mentioned above, the density estimation model may be selected from a group consisting of a Gaussian model, a tophat model, an Epanechnikov model, an exponential model, a linear model and a cosine model.

In the step 1250, the possible-CA cell density distribution is compared against a low-risk threshold and a high-risk threshold to identify low-risk and high-risk regions containing CA, respectively. The tumor probability heatmap is then generated in the step 1260 according to the identified low-risk and high-risk regions.

The present disclosure further provides a computer-implemented method for predicting one or more quality-control-related parameters in running a triage system used for diagnosing CA cases.

Figure 13:
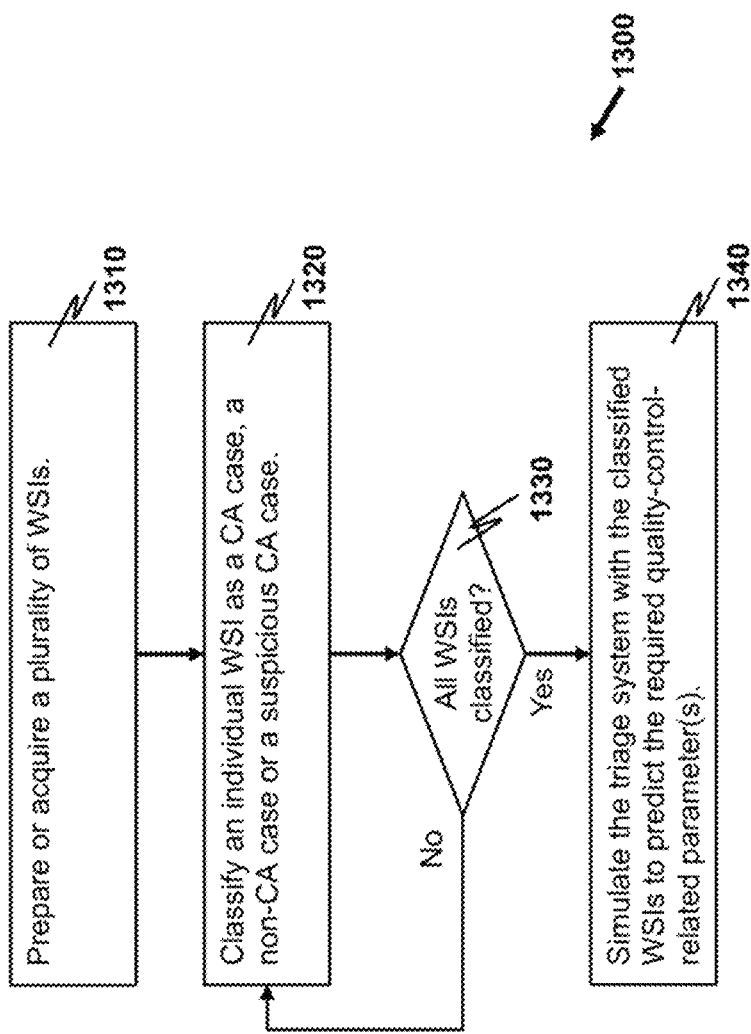
FIG. 13 depicts a flowchart for exemplarily illustrating a second computer-implemented method for predicting one or more quality-control-related parameters in running a triage system used for diagnosing CA cases as disclosed herein in the present disclosure.

The disclosed method is illustrated with the aid of FIG. 13, which depicts a flowchart showing exemplary steps of a second method 1300 for predicting the one or more quality-control-related parameters in running the triage system used for diagnosing CA cases. Exemplarily, the second method 1300 comprises steps 1310, 1320, 1330 and 1340.

In the step 1310, a plurality of WSIs for CA detection is prepared or acquired. An individual WSI contains a plurality of cells. The individual WSI is then processed in the step 1320 to detect CA according to the first method 900 that includes at least the steps 920 and 930. As a result, the individual WSI is classified as a CA case, a non-CA case or a suspicious CA case. The step 1320 is repeated until the plurality of WSIs is processed, or is repeated until the entire plurality of WSIs is processed (the step 1330). Note that the plurality of WSIs is divided into a first plurality of WSIs classified as CA cases, a second plurality of WSIs classified as non-CA cases, and a third plurality of WSIs classified as suspicious CA cases. In the step 1340, the triage system is simulated with the first, second and third pluralities of classified WSIs as inputs to the triage system to predict the one or more quality-control-related parameters.

In certain embodiments, a first quality-control-related parameter selected from the one or more quality-control-related parameters is a percentage of non-CA cases for respective non-CA cases to be skipped by using the machine learning or deep learning algorithm-based triage system against under no case prioritization.

In certain embodiments, a second quality-control-related parameter selected from the one or more quality-control-related parameters is a possible time saved in diagnosing the plurality of WSIs by using the triage system against under no case prioritization.

In certain embodiments, a third quality-control-related parameter selected from the one or more quality-control-related parameters is a percentage of time for respective non-CA cases to be skipped by a pathologist or a related medical professional.

Embodiments of the two disclosed computer-implemented methods are realizable by appropriate programming on a computing platform according to the teachings of the present disclosure. The computing platform may be formed by one or more computing devices. An individual computing device may be a general-purpose computer, a special-purpose computer such as the one implemented with artificial intelligence processor(s), a desktop computer, a physical computing server, a distributed computing server, or a mobile computing device such as a smartphone and a tablet computer.

The present disclosure may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

REFERENCES

There follows a list of references that are occasionally cited in the specification. Each of the disclosures of these references is incorporated by reference herein in its entirety.

[1] Esteva A, Chou K, Yeung S, Naik N, Madani A, Mottaghi A, et al. Deep learning-enabled medical computer vision. NPJ digital medicine. 2021; 4(1):1-9.

[2] van der Laak J, Litjens G, Ciompi F. Deep learning in histopathology: the path to the clinic. Nature medicine. 2021; 27(5):775-84.

[3] Araujo T, Aresta G, Castro E, Rouco J, Aguiar P, Eloy C, et al. Classification of breast cancer histology images using Convolutional Neural Networks. PLoS One. 2017; 12(6):e0177544.

[4] Kanavati F, Toyokawa G, Momosaki S, Takeoka H, Okamoto M, Yamazaki K, et al. A deep learning model for the classification of indeterminate lung carcinoma in biopsy whole slide images. Scientific Reports. 2021; 11(1):1-14.

[5] Bychkov D, Linder N, Turkki R, Nordling S, Kovanen P E, Verrill C, et al. Deep learning based tissue analysis predicts outcome in colorectal cancer. Scientific reports. 2018; 8(1):1-11.

[6] Kather J N, Pearson A T, Halama N, Jager D, Krause J, Loosen S H, et al. Deep learning can predict microsatellite instability directly from histology in gastrointestinal cancer. Nat Med. 2019; 25(7):1054-6.

[7] Nam S, Chong Y, Jung C K, Kwak T-Y, Lee J Y, Park J, et al. Introduction to digital pathology and computer-aided pathology. Journal of pathology and translational medicine. 2020; 54(2):125.

[8] Bera K, Schalper K A, Rimm D L, Velcheti V, Madabhushi A. Artificial intelligence in digital pathology—new tools for diagnosis and precision oncology. Nature reviews Clinical oncology. 2019; 16(11):703-15.

[9] Marini N, Otálora S, Müller H, Atzori M. Semi-supervised training of deep convolutional neural networks with heterogeneous data and few local annotations: An experiment on prostate histopathology image classification. Medical image analysis. 2021:102165.

[10] Campanella G, Hanna M G, Geneslaw L, Miraflor A, Silva V W K, Busam K J, et al. Clinical-grade computational pathology using weakly supervised deep learning on whole slide images. Nature medicine. 2019; 25(8): 1301-9.

[11] Hou L, Samaras D, Kurc T M, Gao Y, Davis J E, Saltz J H, editors. Patch-based convolutional neural network for whole slide tissue image classification. Proceedings of the IEEE conference on computer vision and pattern recognition; 2016.

[12] Xu Y, Zhu J-Y, Eric I, Chang C, Lai M, Tu Z. Weakly supervised histopathology cancer image segmentation and classification. Medical image analysis. 2014; 18(3): 591-604.

[13] Mun Y, Paik I, Shin S-J, Kwak T-Y, Chang H. Yet Another Automated Gleason Grading System (YAAGGS) by weakly supervised deep learning. npj Digital Medicine. 2021; 4(1):1-9.

[14] Wang X, Chen H, Gan C, Lin H, Dou Q, Tsougenis E, et al. Weakly supervised deep learning for whole slide lung cancer image analysis. IEEE transactions on cybernetics. 2019; 50(9):3950-62.

[15] Bukowy J D, Foss H, McGarry S D, Lowman A K, Hurrell S L, Iczkowski K A, et al. Accurate segmentation of prostate cancer histomorphometric features using a weakly supervised convolutional neural network. Journal of Medical Imaging. 2020; 7(5):057501.

[16] Matsui Y, Utsunomiya N, Ichioka K, Ueda N, Yoshimura K, Terai A, et al. The use of artificial neural network analysis to improve the predictive accuracy of prostate biopsy in the Japanese population. Japanese journal of clinical oncology. 2004; 34(10):602-7.

[17] Assi E B, Gagliano L, Rihana S, Nguyen D K, Sawan M. Bispectrum features and multilayer perceptron classifier to enhance seizure prediction. Scientific reports. 2018; 8(1):1-8.

[18] Lin S-K, Hsiu H, Chen H-S, Yang C-J. Classification of patients with Alzheimer's disease using the arterial pulse spectrum and a multilayer-perceptron analysis. Scientific reports. 2021; 11(1):1-14.

What is claimed is:

1. A computer-implemented method for processing a whole slide image (WSI) to detect carcinoma (CA), the method comprising:
    setting up a machine-learning model for classifying the WSI as a CA case or as a non-CA case, the machine-learning model being realized as a plurality of ensembled networks with a classification decision made by the machine-learning model according to a plurality of probabilities of having malignancy respectively generated by the plurality of ensembled networks, an individual ensembled network being realized as a multilayer perception (MLP) network configured by a plurality of hyperparameters, the plurality of hyperparameters being learnable, wherein the machine-learning model is arranged to process a plurality of averaged cellular features for CA detection, and wherein an individual averaged cellular feature is a descriptive statistic of cells identified on the WSI, allowing a training dataset for training the machine-learning model and a testing dataset for verifying the trained machine-learning model to be constructed without a need to involve a costly annotation process of pixelwise labelling each cell on a WSI training sample; and
    using the training and testing datasets to learn respective pluralities of hyperparameters for the plurality of ensembled networks and to train the plurality of ensembled networks.

2. The method of claim 1, wherein a plurality of descriptive statistics forming the plurality of averaged cellular features includes a plurality of statistical parameters regarding geometric dimensions of the identified cells and regarding optical densities of staining reagents applied to the identified cells.

3. The method of claim 1, wherein the plurality of hyperparameters is selected from a group consisting of a choice of activation function, a choice of L2 regulation term, a dropout rate, a number of hidden layers, a shape of the hidden layers, a choice of last-neuron activation function, a choice of optimization algorithm, a choice of loss function, an epoch size and a batch size.

4. The method of claim 1, wherein:
    the plurality of ensembled networks consists of a predetermined number of ensembled networks; and
    the respective pluralities of hyperparameters as learnt are optimized pluralities of hyperparameters such that the plurality of ensembled networks consists of the predetermined number of best-performing ensembled networks over a plurality of ensembled-network candidates contending for inclusion in the plurality of ensembled networks.

5. The method of claim 4, wherein the predetermined number is selected to be an odd number.

6. The method of claim 1, wherein the classification decision made by the machine-learning model is a majority vote of respective classification decisions made by the plurality of ensembled networks, and wherein the individual ensembled network makes a corresponding classification decision according to a corresponding probability of having malignancy generated by the individual ensembled network.

7. The method of claim 1, wherein the machine-learning model makes the classification decision according to an average probability of having malignancy over the plurality of ensembled networks.

8. The method of claim 1 further comprising predicting the CA case or the non-CA case from the WSI, wherein the predicting of the CA case or the non-CA case from the WSI comprises:
    identifying a plurality of cells on the WSI;
    extracting a plurality of cellular features of different types for an individual cell, whereby respective pluralities of cellular features of different types are obtained for the plurality of cells;
    down-sampling the respective pluralities of cellular features of different types into the plurality of averaged cellular features, wherein an individual average cellular feature is obtained by averaging cellular features of a corresponding type in the respective pluralities of cellular features of different types; and
    using the trained machine-learning model to process the plurality of averaged cellular features to predict whether the plurality of cells identified on the WSI constitutes the CA case or the non-CA case.

9. The method of claim 8, wherein the identifying of the plurality of cells on the WSI comprises using a watershed algorithm to segment the WSI into the plurality of cells.

10. The method of claim 8, wherein the identifying of the plurality of cells on the WSI comprises using a convolutional neural network (CNN) to segment the WSI into the plurality of cells after the CNN is trained.

11. The method of claim 8, wherein in using the trained machine-learning model to process the plurality of averaged cellular features to predict the CA case or the non-CA case, the machine-learning model computes an average probability of having malignancy over the plurality of ensembled networks as a malignancy prediction score for indicating a likelihood of presence of potential CA cells for the WSI, the average probability of having malignancy being computed according to the plurality of probabilities of having malignancy generated by the plurality of ensembled networks.

12. The method of claim 11 further comprising prioritizing a suspicious CA case from the WSI after the non-CA case is predicted for the WSI, wherein the prioritizing of the suspicious CA case from the WSI comprises:
    collecting a plurality of checked WSIs, an individual checked WSI being predicted to be the non-CA case;
    tiling the WSI and the plurality of checked WSIs to form a composite WSI;
    extracting a second plurality of average cellular features for the composite WSI;
    using the trained machine-learning model to process the second plurality of average cellular features instead of the plurality of average cellular features to thereby predict the CA case or the non-CA case for the composite WSI;
    responsive to predicting that the composite WSI is the CA case, changing a classification of the WSI from the non-CA case to the suspicious CA case; and
    responsive to classifying the WSI as the suspicious CA case, triaging the WSI for priority assessment of CA.

13. A computer-implemented method for predicting one or more quality-control-related parameters in running a triage system used for diagnosing carcinoma (CA) cases, the method comprising:
    preparing or acquiring a plurality of whole slide images (WSIs) for CA detection, wherein an individual WSI contains a plurality of cells;
    processing the individual WSI to detect CA according to the method of claim 12 to thereby classify the individual WSI as a CA case, a non-CA case or a suspicious CA case;
    repeating the processing of the individual WSI for the plurality of WSIs so as to divide the plurality of WSIs into a first plurality of WSIs classified as CA cases, a second plurality of WSIs classified as non-CA cases, and a third plurality of WSIs classified as suspicious CA cases; and
    simulating the triage system with the first, second and third pluralities of classified WSIs as inputs to the triage system to predict the one or more quality-control-related parameters.

14. The method of claim 13, wherein a first quality-control-related parameter selected from the one or more quality-control-related parameters is a percentage of non-CA cases for respective non-CA cases to be skipped by using the machine learning or deep learning algorithm-based triage system against under no case prioritization.

15. The method of claim 13, wherein a second quality-control-related parameter selected from the one or more quality-control-related parameters is a possible time saved in diagnosing the plurality of WSIs by using the triage system against under no case prioritization.

16. The method of claim 13, wherein a third quality-control-related parameter selected from the one or more quality-control-related parameters is a percentage of time for respective non-CA cases to be skipped by a pathologist or a related medical professional.

17. The method of claim 1 further comprising generating a tumor probability heatmap of the WSI for facilitating visualization of potential CA regions on the WSI to assist pathological assessment of the WSI, wherein the generating of the tumor probability heatmap comprises:
    identifying a plurality of cells on the WSI;
    extracting a plurality of cellular features of different types for an individual cell, whereby respective pluralities of cellular features of different types are obtained for the plurality of cells;
    using the trained machine-learning model to process the plurality of cellular features of different types instead of the plurality of averaged cellular features to thereby generate the plurality of probabilities of having malignancy so as to compute an average probability of having malignancy over the plurality of ensembled networks as a malignancy prediction score for indicating a likelihood that the individual cell is a potential CA cell, whereby a plurality of malignancy prediction scores is respectively generated for the plurality of cells;
    using a density estimation model to estimate a possible-CA cell density distribution over the WSI from the plurality of malignancy prediction scores;
    comparing the possible-CA cell density distribution against a low-risk threshold and a high-risk threshold to identify low-risk and high-risk regions containing CA, respectively; and
    generating the tumor probability heatmap according to the identified low-risk and high-risk regions.

18. The method of claim 17, wherein the density estimation model is selected from a group consisting of a Gaussian model, a tophat model, an Epanechnikov model, an exponential model, a linear model and a cosine model.

* * * * *